G. W. PROUTY.
HICKEY.
APPLICATION FILED APR. 19, 1915.

1,171,880.

Patented Feb. 15, 1916.

INVENTOR:
Gardner W. Prouty
by Macleod, Calver, Copeland & Dike
Attys.

UNITED STATES PATENT OFFICE.

GARDNER W. PROUTY, OF LITTLETON, MASSACHUSETTS, ASSIGNOR TO THE MACALLEN COMPANY, OF BOSTON, MASSACHUSETTS, A CORPORATION OF MASSACHUSETTS.

HICKEY.

1,171,880.

Specification of Letters Patent. Patented Feb. 15, 1916.

Application filed April 19, 1915. Serial No. 22,224.

*To all whom it may concern:*

Be it known that I, GARDNER W. PROUTY, a citizen of the United States, residing at Littleton, county of Middlesex, State of Massachusetts, have invented a certain new and useful Improvement in Hickeys, of which the following is a specification, reference being had therein to the accompanying drawings.

My invention relates to hickeys such as are ordinarily employed in suspending lighting fixtures such as chandeliers, electroliers and the like to connect the insulating joint with the outlet pipe and to permit the passage of wires around the insulating joint.

Heretofore in the installation of lighting fixtures great difficulty has been experienced owing to the fact that it has been difficult to fish the ends of the wires through the side opening in the hickey, and this has commonly been done with a pointed hook or other sharp instrument which frequently results in serious injury to the insulation and introduces an additional source of danger. Various attempts have been made to obviate this difficulty and to lessen the labor of installation, notably by the use of two-part hickeys, which are put together after the wires have been passed through the side openings, but such hickeys have proved to be unsatisfactory and unreliable.

My present invention has for its object a simple and inexpensive hickey, which will require no more labor to install than the two part hickey, and will do away with the necessity for using a hook, and will eliminate the danger of injury to the insulation of the wires.

The hickey embodying my invention is no more expensive to manufacture than the ordinary two opening one-piece hickey now commonly employed and which is subject to the objections heretofore mentioned.

The invention will be fully understood from the following description taken in connection with the accompanying drawings and the novel features thereof will be pointed out and clearly defined in the claims at the close of the specification.

Figure 1:
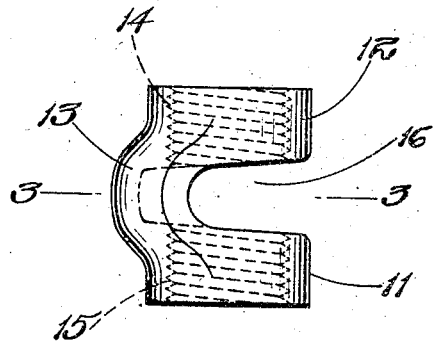
Figure 2:
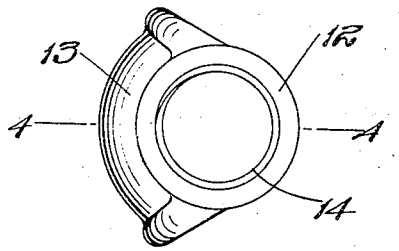
Figure 3:
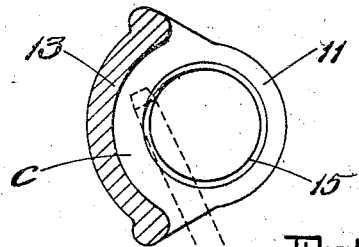
Figure 4:
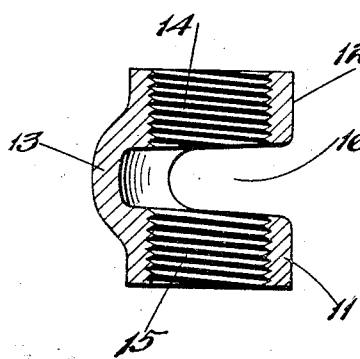

In the drawings, Figure 1 is a side elevation of a hickey embodying my invention. Fig. 2 is a top plan view thereof. Fig. 3 is a section on line 3—3 in Fig. 1. Fig. 4 is a section on line 4—4 in Fig. 2.

In the drawings, at 11 and 12 are shown what may be conveniently termed the two end members of the hickey, and at 13 is shown the connecting member or neck, these parts being preferably integral, and the whole hickey being made from a single piece of suitable metal. The two end members 11 and 12 have screw threaded end openings 14 and 15 therethrough of proper size for engagement with the proximate members which in ordinary practice are the outlet pipe and the insulating joint, or the outlet pipe or stud and the fixture. The two end members 11 and 12 of the hickey are separated from each other by a single side opening 16, the limits of which are defined by the edges of the connecting member or neck 13. The said connecting member or neck 13 is sprung or bulged outwardly so as to permit the side opening 16 to be carried well to the side of the center line, the object being to have a single large opening extending through from front to back of the hickey for the full width of the holes in the end of the hickey. The extent of the opening will plainly be seen from Fig. 3 where the neck or connecting member is indicated by cross hatching. The side opening 16 is also extended beyond the end openings 14 and 15 in an arc-shaped area as indicated at c formed by the bulge or curve of the neck. This materially increases the strength of the hickey as well as increases the size of the opening. The hickey may be made very strong. The side opening 16 is so placed with relation to the end openings 14 and 15 through one of which the wires pass and is of such a size that a workman has practically free access to the ends of the wires. This is shown in Fig. 3 where the point of a screw driver is shown as introduced into the side opening to fish out the wires. There is no danger of injury to the insulation of the wire under ordinary conditions of use.

The fishing out of the wire can be done almost instantly and without difficulty even in a dark place. It is not necessary to use a hook as has heretofore been used since any straight or substantially straight member can be used for the purpose, for instance a screw driver handle, the handle of a pair of pliers, a pencil or the like.

What I claim is:

1. The improved hickey comprising two tubular end members having an opening between them, the tubular opening of one end member being in line with the tubular opening of the other end member, said end members being secured together by a single connecting member which is located entirely at one side of the longitudinal axis of the hickey.

2. The improved hickey comprising a pair of tubular end members, and a connecting member securing said end members together, said connecting member being located at one side of the longitudinal axis of the hickey, said end members having a single opening between them which extends more than half around the circumference of the hickey.

In testimony whereof I affix my signature, in presence of two witnesses.

GARDNER W. PROUTY.

Witnesses:
 GEORGE P. DIKE,
 ALICE H. MONSON.